United States Patent [19]

Genovese

[11] Patent Number: 5,418,600
[45] Date of Patent: May 23, 1995

[54] CONFORMABLE FRICTION DRIVE SYSTEM FOR BELT OR DRUM TRANSPORT

[75] Inventor: Frank C. Genovese, Fairport, N.Y.
[73] Assignee: Xerox Corporation, Stamford, Conn.
[21] Appl. No.: 169,821
[22] Filed: Dec. 17, 1993
[51] Int. Cl.⁶ ............................................ G03G 15/00
[52] U.S. Cl. ................... 355/200; 355/211; 474/111; 474/135; 474/237
[58] Field of Search .................. 355/200, 211, 212; 476/16, 17, 72; 474/92, 237, 270, 271, 111, 133, 135

[56] References Cited

U.S. PATENT DOCUMENTS

| | | | |
|---|---|---|---|
| 4,075,901 | 2/1978 | Freyermuth | 476/16 |
| 4,149,202 | 4/1979 | Terada et al. | 476/16 |
| 4,290,520 | 9/1981 | Rhodes | 474/92 X |
| 4,320,963 | 3/1982 | Satomi | 355/50 |
| 4,321,869 | 3/1982 | Jeschke et al. | 101/136 |
| 4,342,809 | 8/1982 | Newell | 474/237 X |
| 4,531,828 | 7/1985 | Hoshimo | 355/272 |
| 4,627,702 | 12/1986 | Anderson | 355/212 |
| 4,701,816 | 10/1987 | Ida | 476/16 |
| 4,796,050 | 1/1989 | Furuta | 355/317 |
| 5,202,733 | 4/1993 | Hediger et al. | 355/271 |
| 5,262,826 | 11/1993 | Hediger | 355/212 |
| 5,313,689 | 5/1994 | Oexler | 474/92 X |

FOREIGN PATENT DOCUMENTS

| | | | |
|---|---|---|---|
| 0075757 | 4/1988 | Japan | 355/211 |
| 0088561 | 4/1989 | Japan | 355/211 |
| 0053382 | 3/1993 | Japan | 355/211 |

Primary Examiner—Robert Beatty
Attorney, Agent, or Firm—Denis A. Robitaille

[57] ABSTRACT

A conformable drive system for transporting a surface, such as an imaging surface, along a predetermined path of travel. An intermediate drive assembly, including an endless tape loop, operatively associated with a rotational drive source is provided. The endless tape loop is driven by the rotational drive source such that the tape loop, when positioned in frictional contact with the surface to be transported, induces transport movement of the surface. The tape loop includes a nonelastic support layer for preventing the tape loop from stretching, and also includes a frictional contact layer for providing substantial frictional forces between the tape loop and the surface being transported. The configuration of the conformable drive system provides sufficient contact pressure for imparting a substantially constant velocity vector to the transported surface for maintaining substantially constant speed control of the transported surface.

20 Claims, 4 Drawing Sheets

FIG. 2
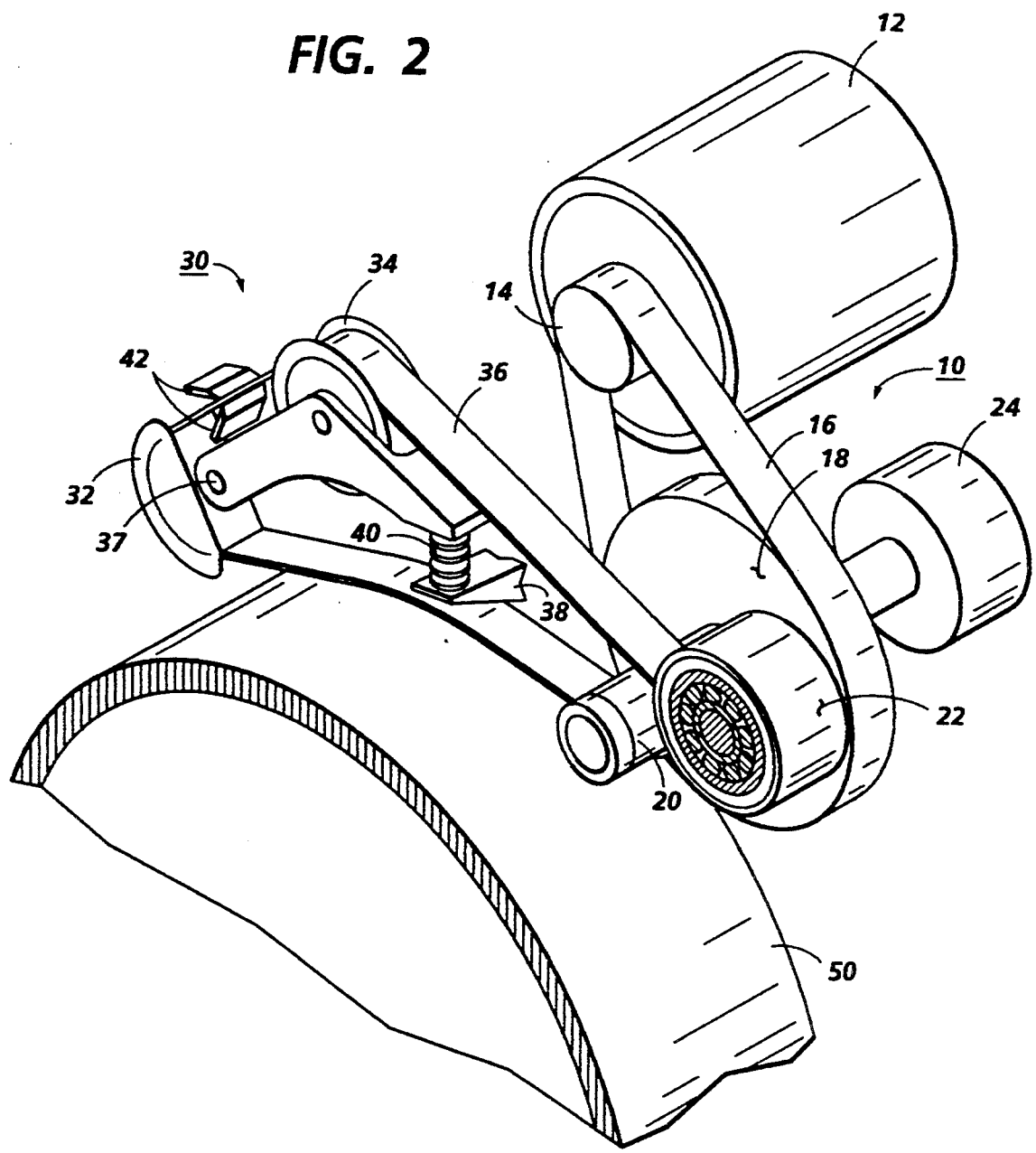
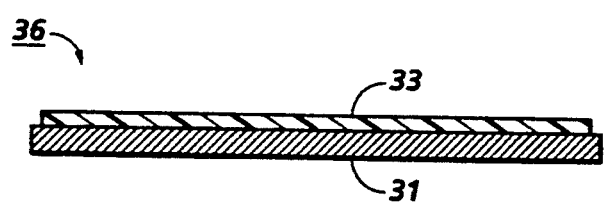
FIG. 3

CONFORMABLE FRICTION DRIVE SYSTEM FOR BELT OR DRUM TRANSPORT

The present invention relates generally to a system for rotating a drum or transporting a belt along a predetermined path, and more particularly, concerns a conformable friction drive system for advancing photoreceptor drum and/or belt surfaces in an electrostatographic printing apparatus.

Generally, the process of electrostatographic printing is initiated by exposing a substantially uniformly charged photoreceptive member with light flux in the form of an image of an original document. Exposing the charged photoreceptive member to a light image discharges the photoconductive surface thereon in areas corresponding to bright areas in the original document, while maintaining the charge in dark areas, thereby creating an electrostatic latent image of the original document on the photoreceptive member. This latent image is subsequently developed into a visible image by flooding the surface of the photoreceptive member with developing material which is attracted to and adheres to the charged latent image areas thereon. The adhered developing material is then transferred from the photoreceptive member to a copy sheet where it is affixed using heat or pressure to provide a permanent reproduction of the original document. In a final step, the surface of the photoreceptive member is cleaned to remove any residual developing material therefrom in preparation for subsequent imaging cycles. This process is well known and is useful for light lens copying from an original, as well as for printing applications using electronically generated images and documents. Analogous processes also exist in other electrostatographic applications such as, for example, ionographic systems, where positive or negative gaseous ions are deposited on a charge retentive surface in accordance with an image stored in electronic form.

In a typical electrostatographic printing machine, a system is provided for transporting or driving the photoreceptive member in the form of a rigid drum or a web-like belt through the various processing stations described herein. It is well known that photoreceptive drums or belts in electrostatographic printing apparatus are often driven by coupling a drive motor to an intermediate cylindrical shaft, either directly or indirectly through chain or belt drives and speed reducers, wherein the cylindrical shaft is, in turn, rigidly coupled to the drum or drives a drum that advances the belt. Generally, such drive systems include a single electric motor coupled to a rotational body mounted on a shaft which is connected to the drum or frictionally coupled to the interior surface of the photoreceptor belt. Such systems also generally include speed reducing subsystems for transmitting desired rotational output power and speed.

Motor driven systems of the type described, generally include a large, heavy and expensive drive motor and compound serpentine mechanical linkages which are inefficient, require a multitude of bearings, pivots, and adjustment mechanisms, and are expensive to produce and assemble. In addition, these mechanisms take up valuable space, introduce unwanted vibration, typically require periodic lubrication, and may cause thermal problems in certain applications. Moreover, in drive systems of this sort, the photoreceptive drum may not be precisely balanced or the belt may be entrained about cylindrical rollers which do not run perfectly true, or which are not configured in an exactly parallel relationship with one another, such that it is not feasible to maintain a velocity vector on the drum or belt at a precisely constant speed at all points. This problem can be further exacerbated by imperfections in the system geometry which cause the drum or belt surface velocity vector to extend along a direction which is not normal to a common datum line.

Since the photoconductive surface of the photoreceptive member is simultaneously transported through a plurality of functionally distinct processing stations during the printing operation, precise and constant speed control thereof is critical for high quality results, and variations in speed must be limited to narrowly prescribed tolerances. In particular, as the photoconductive surface passes through each of the processing stations in turn, the position of the latent image must be precisely defined in order to maintain accurate registration of successive imaging steps relative to each other. If the speed of the photoreceptive member deviates during the latent image creation cycle, copy quality can be significantly degraded, especially when the exposure is applied continuously in a narrow band such as with a raster type laser scanner. Hence, variations in velocity of the moving photoreceptive member must be minimized so that the photoconductive surface is transported at a precisely defined and uniformly constant speed.

Hereinbefore, photoreceptor speed variations have been dampened by heavy inertial loads or "flywheels" More recently, precise speed control of photoreceptive drums or belts is provided by applying servo-motor mechanisms or the combination of servo-motor mechanisms with supplemental inertial load damping. Due to the dynamics of such servo-motor mechanisms, and as a result of limited manufacturing tolerances, actual speed control provided by such systems has been only approximately constant. While modest speed variations may be acceptable in many low-end single color printing applications, precise speed control is very important in most state-of-the-art, high velocity, high quality applications and becomes critical for high quality color electrostatographic printing applications.

Various approaches to the problem of providing constant speed in a drum or belt drive system have been proposed and utilized. For example, remarkably accurate speed control has been achieved by using servo-motor drives that can rapidly readjust the transport speed of a drum or belt surface in response to monitored variations therein. Drive systems of this sort generally incorporate feedback controls that are less effective and more expensive to implement in high speed environments because of the inertial nature of the loads involved.

Various solutions to the problem of constant speed control for movement of a drum or a belt are known in the art. The following disclosures appear to be relevant:

U.S. Pat. No. 4,321,869 Patentee: Jeschke et al. Issued: Mar. 30, 1982

U.S. Pat. No. 4,531,828 Patentee: Hoshino Issued: Jul. 30, 1985

U.S. Pat. No. 4,796,050 Patentee: Furuta et al. Issued: Jan. 3, 1989

U.S. Pat. No. 4,321,869 discloses a drive for cylinders of an offset printing machine having a gear train constructed of spur gears disposed as drive gears on respective shafts of the cylinders. The drive device of that patent includes clamping devices for synchronizing rotation of the cylinders, wherein the clamping devices are rotatable with the spur gears respectively associated therewith, and have respective gear rims deformable in accordance with an adjustment thereof.

U.S. Pat. No. 4,531,828 discloses an image receiving member conveying device for a multiplex image forming apparatus wherein the image receiving member is conveyed and directed to a plurality of image processing stations for forming images on the image receiving member.

U.S. Pat. No. 4,796,050 discloses a mechanism for driving photosensitive drums wherein a plurality of photosensitive drums are arranged such that color separated light images of an original document are formed respectively thereon, each drum being independently driven under equal conditions by a single drive source coupled to a common transmitting means for transmitting drive power from the drive source to each driven drum.

In accordance with one aspect of the present invention, a conformable friction drive system for transporting a surface along a predetermined path of travel is disclosed. The drive system includes drive source means and intermediate drive means including an endless tape loop having a nonelastic support layer and a frictional contact layer, the nonelastic layer being operatively associated with the drive source means for being driven thereby, and the frictional contact layer being placed in friction contact with the surface to induce transport movement thereof.

In accordance with another aspect of the invention, an electrostatographic printing apparatus including an imaging surface and a conformable friction drive system for transporting the imaging surface along a predetermined path of travel is provided. The friction drive system includes a drive source and an intermediate drive system including an endless tape loop adapted to be conformable to the imaging surface, wherein the endless tape loop includes a nonelastic support layer and a frictional contact layer, the nonelastic support layer being operatively associated with the drive source for being driven thereby, and the frictional contact layer being placed in friction contact with the imaging surface to induce transport movement thereof.

Other features of the present invention will become apparent as the following description proceeds and upon reference to the drawings, in which:

FIG. 2 is a perspective view of the conformable friction drive system shown in FIG. 1;

FIG. 3 is an enlarged, fragmentary view of a frictional tape loop utilized in the conformable friction drive system of the present invention.

Figure 1:
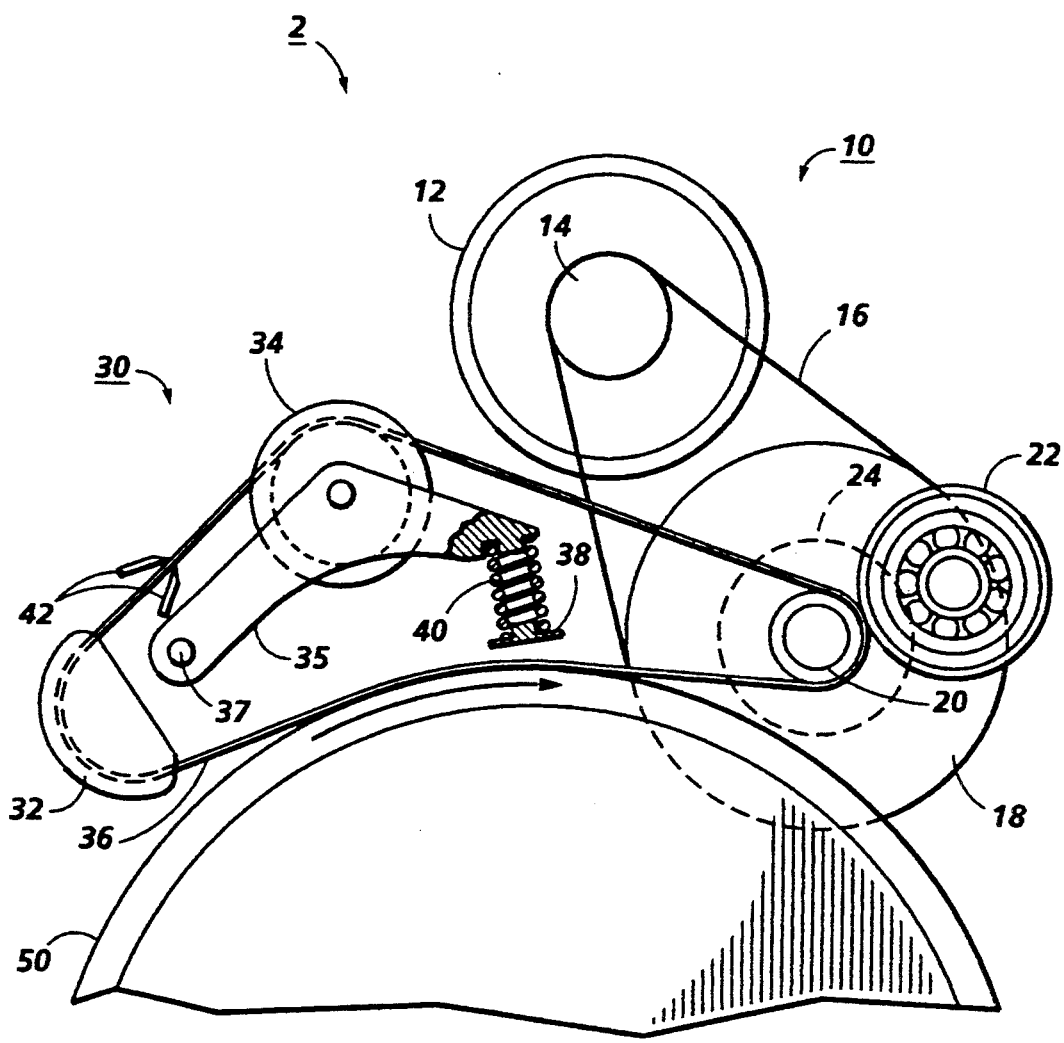
FIG. 1 is a side view of a conformable friction drive system in accordance with the present invention.

Although the present invention is applicable to driving a drum or a continuous belt, as, for example, a photoreceptive member in an electrostatographic printing machine, it will be understood that the invention can be utilized for transporting various surfaces along a predetermined path and, therefore, that the present invention is not limited in its application to electrostatographic or other printing applications. On the contrary, the description of the present invention is intended to cover all alternatives, modifications, and equivalents as may be included within the spirit and scope of the invention as defined by the appended claims.

For a general understanding of the features of the present invention, reference is made to the drawings, in which like reference numerals have been used throughout to designate identical elements. In addition to the drawings provided herein, reference is also made to the voluminous patent literature available in the electrostatographic printing art, exemplary of which is commonly assigned U.S. Pat. No. 5,218,405 which schematically depicts the various components of an illustrative electrostatographic printing machine incorporating both drum and belt photoreceptor surfaces, the entire contents of which is incorporated by reference herein. It will become evident from the following discussion that the conformable friction drive system of the present invention is equally well suited for use in a wide variety of devices and is not necessarily limited to the particular embodiment shown herein. For example, the apparatus of the present invention may readily be employed in magnetic audio or video tape systems, motion picture camera systems, film projection systems, and textile manufacturing systems among others.

FIGS. 1 and 2 show an illustrative embodiment of the inventive conformable friction drive system, generally indicated by reference numeral 2. As shown in the exemplary embodiment illustrated by FIGS. 1 and 2, a drive source 10 is coupled to an intermediate drive generating apparatus 30 for inducing friction driven transport movement to photoconductive surface 5(::).

Drive source 10 includes an electrical drive motor 12 having a drive shaft 14 extending from the drive motor 12 along a central axis thereof. The drive shaft 14 is coupled to a flywheel 18 by means of a frictionally entrained drive belt 16. Alternatively, the coupling may be of the toothed timing belt type. In a preferred embodiment, the dimensional ratio between drive shaft 14 and flywheel 18 is on the order of 1:3, thereby allowing for the use of a relatively low torque drive motor. Flywheel 18 can be provided with a cross sectional thickness chosen as needed to determine its rotational moment of inertia in the drive train. Generally the moment of inertia of flywheel 18 is optimized to minimize the effects of transient disturbances and to maximize the overall speed uniformity of the system in response to the feedback signal applied via the drive motor 12. Flywheel 18 also includes a drive capstan 20 coaxially mounted thereon for coupling the rotational movement from the flywheel 18 to the intermediate drive generating apparatus 30, as will be described.

Intermediate drive generating apparatus 30 includes a drag shoe 32, and a tape tensioning sheave 34 mounted in the plane of the drive capstan 20, for operative association therewith. The component elements of the drive generating apparatus 30 are positioned in a common plane defining a predetermined path of travel for a drive tape loop 36 cooperatively positioned in alignment with, and entrained over, each of these component elements. While capstan 20 is mounted on flywheel 18 for rotation therewith, as previously described, drag shoe 32 is fixedly mounted and provided with a controlled friction surface coating, and tape tensioning sheave 34 is rotationally mounted on lever arm 35 which together define a predetermined path of travel for drive tape loop 36. The lever arm 35 is pivotally mounted at a fixed pivot point 37 and preloaded to apply a tensioning force to drive tape loop 36 by means of a resilient spring 40 mounted between a fixed support arm 38 and the lever arm 35. A pinch roll member 22 is also provided adjacent to drive capstan 20 for applying external force to the tape loop at the point of contact with capstan 20, thereby preventing slippage by increasing the normal contact forces. In addition to the drive components described hereinabove, a cleaning apparatus, preferably including cleaning blades 42, is also provided, wherein the cleaning blades 42 are positioned in resilient engagement with the drive tape loop 36 for removing extraneous debris therefrom. This cleaning apparatus provides a means to maintain tight contact at the drive capstan 20 for maximum drive rigidity and consistent control of the tape loop velocity vector.

Utilizing the disclosed configuration, drive tape loop 36 is driven by capstan 20 around the predetermined path defined by the capstan 20, the drag shoe 32, and the tape tensioning sheave 34, and is positioned in friction engagement with photoconductive surface 50, shown here as a rigid drum, for inducing transport movement thereof. Thus, the general function of the intermediate drive generating apparatus 30 is to couple rotational movement from drive motor 12 to the photoconductive surface 50 in a manner that provides a constant velocity vector along the path of travel of the photoconductive surface 50, free of effects that contribute to irreducible velocity variations such as fluctuations in drum diameter as well as irregularities in conicity, straightness, roundness, and eccentricity of shafts and other rotational members. The exemplary embodiment shown in FIGS. 1 and 2, provides constant surface speed at the tangent point of contact between the photoconductive surface 50 and the drive tape loop 36, the surface speed being substantially equivalent to the circumferential speed of the capstan 20, independent of the diameter of the photoreceptor drum.

In order to provide control of the rotation of capstan 20, a rotary encoder system 24 is provided for detecting the incremental angular displacement of capstan 20 on the common shaft with flywheel 18. Encoding systems for this purpose are well known in the art, exemplary of which is a single channel encoder as disclosed in U.S. Pat. No. 5,206,645, the entire contents of which are incorporated by reference herein. The encoder 24 provides an output signal which is used in a negative feedback control loop for dynamically adjusting the instantaneous speed of the shaft of encoder 24 and, in turn, the coaxial capstan 20, from the action of motor 12 via drive belt 16 and inertial flywheel 18. With respect to the encoder hardware, the compact nature of the conformable friction drive system disclosed by the present invention provides both very tight coupling to the photoconductive surface, essentially free of mechanical backlash, as well as advantageously enhanced effective encoder resolution as a result of the small physical circumference of capstan 20, which is substantially less than that of typical photoreceptive drums, thereby allowing higher resolution feedback control of the photoreceptor motion. Alternatively, a feedback system providing nominal feedback loop control can be provided with lower resolution components at proportionately less expense.

Referring now to FIG. 3, the drive tape loop 36 of the present invention is preferably fabricated from high tension steel or similar material for providing a nonelastic support substrate layer 31 as a foundation for the endless drive tape loop 36. In this manner, tape stretch is virtually eliminated as a source of speed irregularities. The support substrate layer 31 may be formed from a metal ribbon that is welded and ground or lapped to remove irregularities. Alternatively, the nonelastic material may be cut from a tube, or electroformed. A very thin uniform layer of wear resistant polymer or other pliable material is bonded to the outer face of the loop, as shown in FIG. 3 to provide a frictional contact layer 33. As with rubber and other elastomeric industrial materials, the bonded layer can be machined to very thin and precise dimensions by mechanically grinding the exposed surface under copious liquid lubrication as the loop is circulated in a tooling fixture. This pliable coating provides a positive frictional surface layer 33 for contacting the smooth belt or drum surface 50 of the photoreceptor such that positive contact adherence is formed therebetween with minimal contact force. ! t will be understood by those of skill in the art that the nonelastic substrate layer 31 of loop 36 is rigidly coupled to the hard surface of capstan 20 by direct contact which essentially precludes any mechanical hysteresis or backlash. It is less obvious that the yielding property that allows the frictional contact layer 33 to provide good conformability and high frictional contact forces with the driven surface does not compromise the rigidity of the coupling between the nonelastic substrate layer 31 and the driven surface 50 through the intervening elastomer layer 33. Rigidity is maintained because the elastomer is deliberately thin, and driving contact is established over an area of relatively long dimensions. Under these conditions the net coupling stiffness of the elastomeric layer 31 can be made arbitrarily high by reducing its thickness and extending the length of contact between loop 36 and surface 50.

Figure 4:
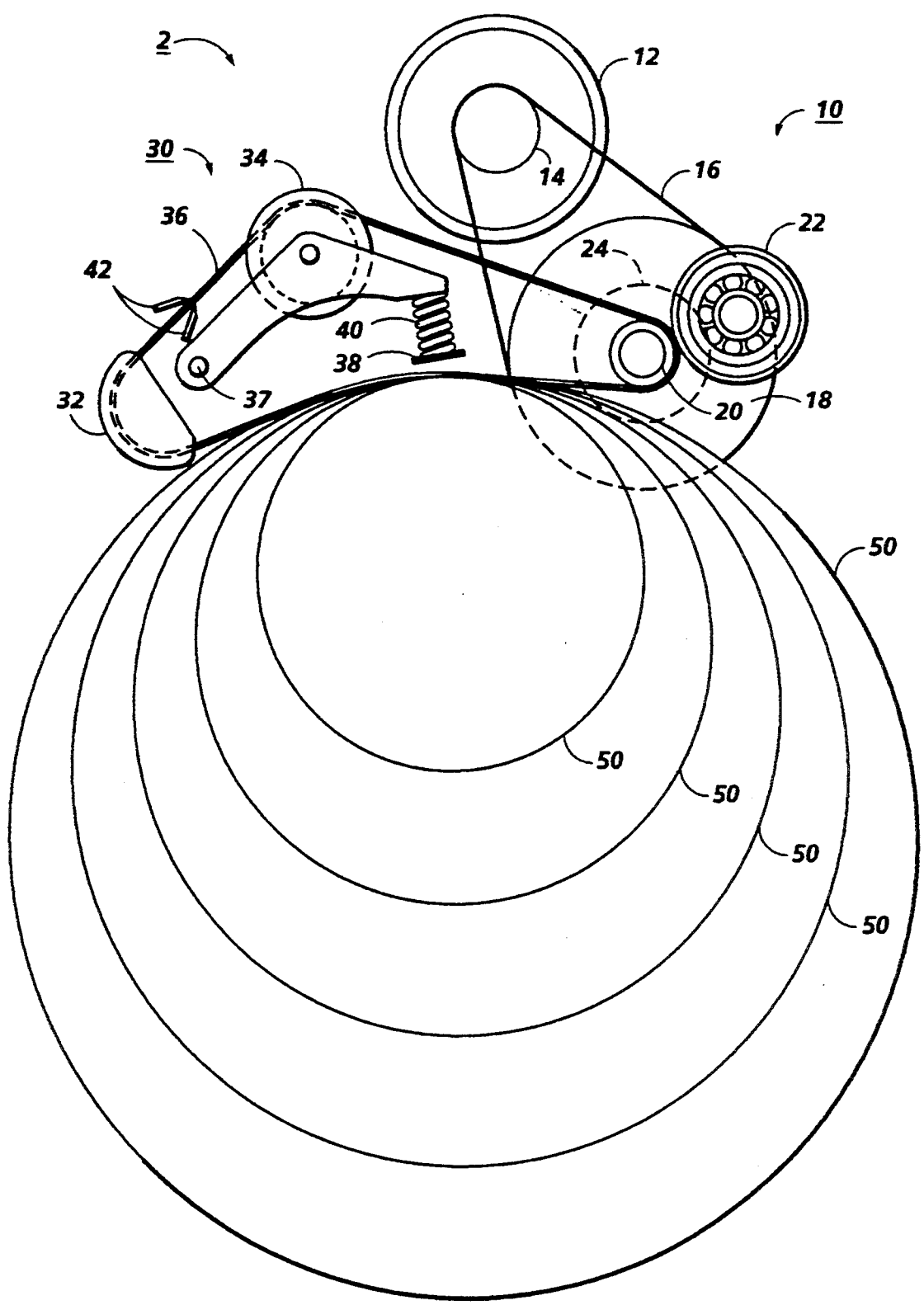
FIG. 4 is a side view of the conformable friction drive system of the present invention shown in an operational configuration with rotational drums having various diameters.
Figure 5:
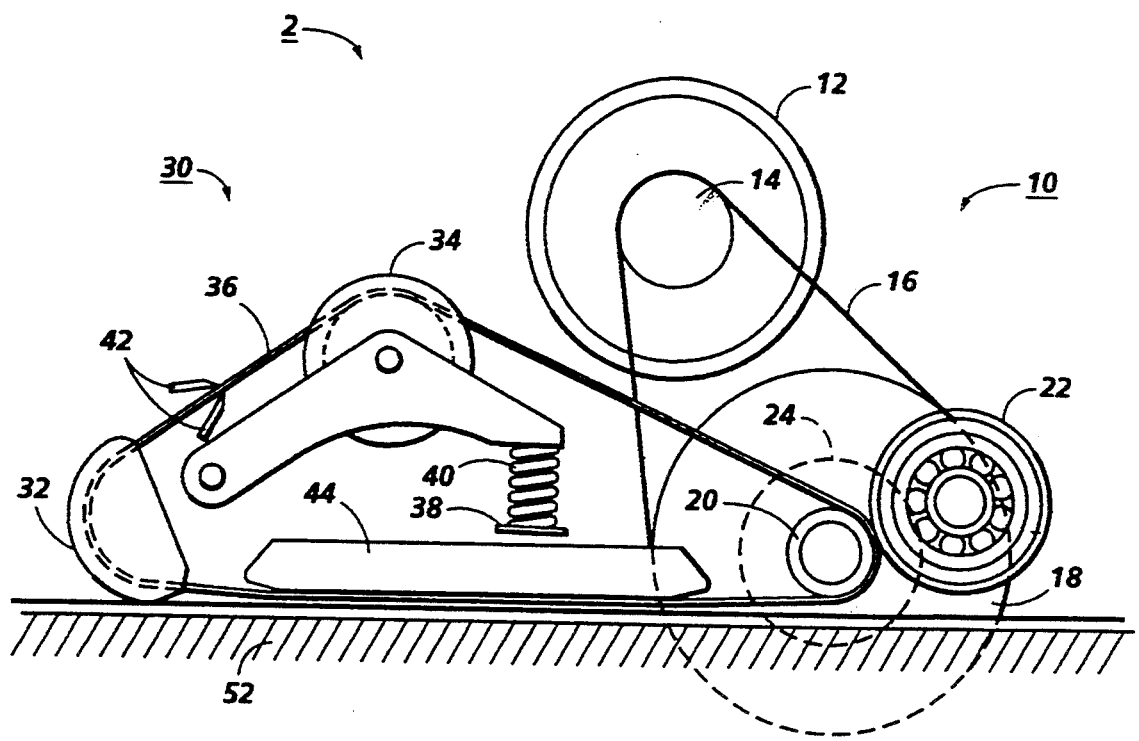
FIG. 5 is a side view of the conformable friction drive system of the present invention shown in an operational configuration with a web-like belt.

It can be seen in FIGS. 4 and 5 that the conformable friction drive system disclosed herein provides a versatile design configuration which can be used to impart uniform motion in various machines and apparatus having transport surfaces of various sizes and forms. In this vein, it will be recognized from FIG. 4 that the exact same hardware can be used to provide identical surface speed to the surfaces of drums of various diameters. Further, with reference to FIG. 5, the conformable friction drive system can also be utilized to drive a flat surface such as a photoreceptor belt with only slight modification. In this embodiment, it may be advantageous to provide a fixed and/or a spring loaded shoe 44 in combination with and low friction support surface 52 for enhancing the contact engagement between the friction drive tape loop 36 and the photoconductive surface 50.

Figure 6:
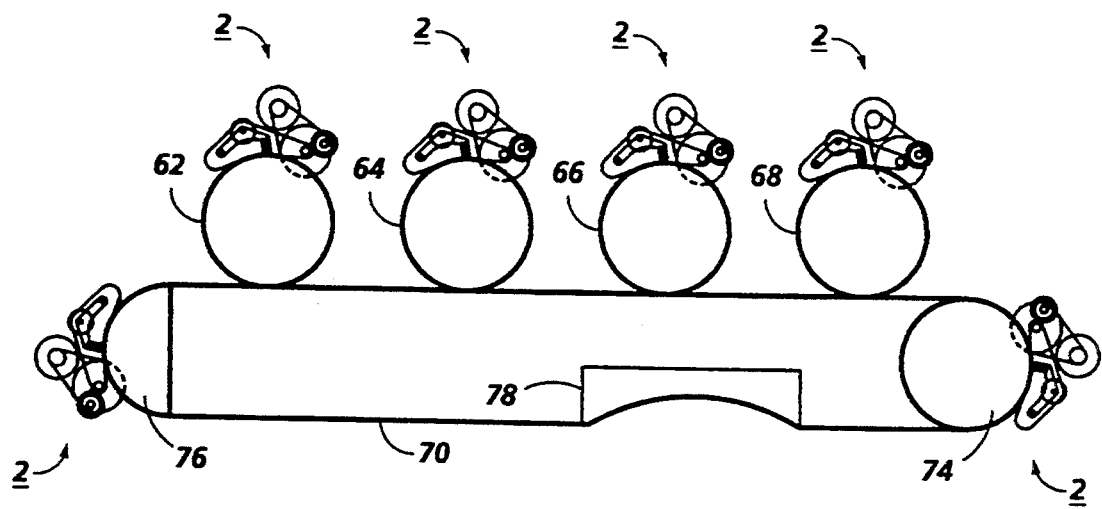
FIG. 6 is a side view of a typical tandem architecture electrostatographic printing machine showing various configurations in which the conformable drive system of the present invention might be advantageously utilized.

Referring now to FIG. 6, a well known tandem architecture engine, commonly used for multicolor imaging and disclosed in previously referenced U.S. Pat. No. 5,218,405, among other patents and publications, is shown. A typical electrostatographic printing machine of this type includes four photoreceptors 62, 64, 66 and 68. Each photoreceptor carries a unique color separation obtained by an individual electrostatographic processor. The four color separations are transferred to an intermediate belt 70 in precise registration with one another to produce a full color image. Photoreceptors 62, 64, 66 and 68 are driven by independently controllable conformable friction drive systems in accordance with the present invention, each generally identified by reference numeral 2. In this configuration, photoreceptive drums can each be independently controlled and phased by separate and independent conformable drive mechanisms as shown. Intermediate transfer belt 70 may also be driven by additional independently controllable conformable friction drive mechanisms of the present invention, also generally identified by reference numeral 2. The intermediate transfer belt can be transported along its predetermined path by means of one, or a plurality of conformable drive mechanisms. As shown, the conformable drive mechanisms can be mounted opposite an idler drum 74, or a low friction drag shoe 76. Alternatively, a singular conformable drive can be positioned adjacent a substantially planar surface area of the photoconductive belt (not shown). In these various configurations it may be advantageous to provide a vacuum tensioner 78, as is well known in the art for accommodating excess belt slack or maintaining substantially uniform tension in the photoreceptor belt along the entire path of travel thereof. Using this system architecture as an example, multiple conformable drive mechanisms as disclosed by the present invention are incorporated in various configurations for providing constant speeds at the various image bearing surfaces of an electrostatographic printing apparatus. A detailed description of specific novel adaptation for the conformable friction drive system of the present invention is provided in a patent application assigned to common assignee, identified by U.S. application Ser. No. 08/169,690, entitled "IMAGE REGISTRATION IN A MULTICOLOR IMAGING APPARATUS UTILIZING CONFORMABLE FRICTION DRIVE SYSTEM".

In recapitulation, it should now be clear from the foregoing discussion, that the apparatus of the present invention provides a novel conformable drive system for advancing a surface along a predetermined path of travel at a well defined velocity. The present invention provides a friction drive assembly, including an endless tape loop, operatively associated with a rotational drive source for being driven thereby, wherein the tape loop is positioned in frictional contact with the surface to be transported for inducing transport movement thereof. It is understood that the configuration of the conformable drive system generates very rigid displacement which is transferred through sufficient contact pressure to impart substantially constant velocity to the transported surface for maintaining substantially constant speed control thereof.

It is, therefore, apparent that there has been provided, in accordance with the present invention a novel conformable drive system that fully satisfies the aims and advantages set forth hereinabove. While the present invention has been described in conjunction with a specific embodiment thereof, it will be evident to those skilled in the art that many alternatives, modifications and variations are possible to achieve the desired results. Accordingly, the present invention is intended to embrace all such alternatives, modifications, and variations which may fall within the spirit and scope of the following claims.

I claim:

1. A conformable drive system for transporting a surface along a predetermined path of travel, comprising:

drive source means; and intermediate drive means including an endless tape loop adapted to be conformable to the surface, said endless tape loop including a nonelastic support layer and a frictional contact layer, the nonelastic support layer being operatively associated with said drive source means for being driven thereby, and the frictional contact layer being placed in contact with the surface to induce transport movement thereof, wherein said intermediate drive means includes:

capstan means, operatively associated with said drive means, for being rotated thereby, said capstan means being partially entrained by said tape loop;

a drag shoe being partially entrained by said tape loop; and tension means being partially entrained by said tape loop;

said capstan means, said drag shoe means, and said tension means being positioned in a single plane to form a path of travel for said tape loop.

2. The conformable drive system of claim 1, wherein said drive source means includes:

a drive motor having a drive shaft;

a drive belt, operatively associated with said drive shaft, for being driven thereby; and a flywheel adapted to be operatively associated with said drive belt for being rotated thereby.

3. The conformable drive system of claim 1, wherein said capstan means is coaxially mounted on said flywheel.

4. The conformable drive system of claim 1, wherein said tension means includes:

a pivotally mounted lever arm;

sheave means mounted on said lever arm for guiding said endless tape loop therethrough; and resilient biasing means for urging said sheave means against said endless tape loop to apply tension thereagainst.

5. The conformable drive system of claim 1, further including a pinch roll member for maintaining said endless tape loop in operative engagement with said capstan means.

6. The conformable drive system of claim 1, further including encoder means operatively associated with said drive means for monitoring the angular rate of rotation thereof.

7. The conformable drive system of claim 1, further including cleaning means operatively associated with said endless tape loop for cleaning the surface thereof.

8. The conformable drive system of claim 7, wherein said cleaning means includes a resilient blade member mounted in contact engagement with a surface of said endless tape loop for providing a wiping action thereagainst as said endless tape loop moves past the resilient blade member.

9. The conformable drive system of claim 1, wherein the surface includes a rotating drum.

10. The conformable drive system of claim 1, wherein the surface includes a belt member.

11. An electrostatographic printing apparatus including an imaging surface and a conformable drive system for transporting the imaging surface along a predetermined path of travel, comprising:

a drive source; and an intermediate drive system including an endless tape loop adapted to be conformable to the surface, said endless tape loop including a nonelastic support layer and a frictional contact layer, the nonelastic support layer being operatively associated with said drive source means for being driven thereby, and the frictional contact layer being placed in contact with the surface to induce transport movement thereof, wherein said friction drive means includes:

a drive capstan operatively associated with said drive source for being rotated thereby, said capstan means being partially entrained by said tape loop;

a drag shoe being partially entrained by said tape loop; and a tension apparatus being partially entrained by said tape loop;

said drive capstan, said drag shoe, and said tensioning apparatus being positioned in a single plane to form a path of travel for said tape loop.

12. The electrostatographic printing apparatus of claim 11, wherein said drive source includes:

a drive motor having a drive shaft;

a drive belt, operatively associated with said drive shaft, for being driven thereby; and a flywheel adapted to be operatively associated with said drive belt for being rotated thereby.

13. The electrostatographic printing apparatus of claim 11, wherein said drive capstan is coaxially mounted on said flywheel.

14. The electrostatographic printing apparatus of claim 1, wherein said tensioning apparatus includes:

a pivotally mounted lever arm;

a sheave member mounted on said lever arm for guiding said endless tape loop therethrough; and a resilient biasing member for urging said reel member against said endless tape loop to apply tension thereagainst.

15. The electrostatographic printing apparatus of claim 11, further including a pinch roll member for maintaining said endless tape loop in operative engagement with said drive capstan.

16. The electrostatographic printing apparatus of claim 11, further including an encoder system operatively associated with said drive source for monitoring the angular rate of rotation thereof.

17. The electrostatographic printing apparatus of claim 11, further including cleaning means operatively associated with said endless tape loop for cleaning the surface thereof.

18. The electrostatographic printing apparatus of claim 17, wherein said cleaning system includes a resilient blade member mounted in contact engagement with a surface of said endless tape loop for providing a wiping action thereagainst as said endless tape loop moves past the resilient blade member.

19. The electrostatographic printing apparatus of claim 11, wherein the imaging surface includes a rotating drum.

20. The electrostatographic printing apparatus of claim 11, wherein the imaging surface includes a belt member.

* * * * *